US 9,707,836 B2

(12) United States Patent
Sykes

(10) Patent No.: US 9,707,836 B2
(45) Date of Patent: Jul. 18, 2017

(54) POWERTRAIN ROLL RESTRICTOR

(71) Applicant: FORD GLOBAL TECHNOLOGIES, LLC, Dearborn, MI (US)

(72) Inventor: Matthew Sykes, Wickford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/558,074

(22) Filed: Dec. 2, 2014

(65) Prior Publication Data

US 2015/0152953 A1 Jun. 4, 2015

(30) Foreign Application Priority Data

Dec. 2, 2013 (GB) .................................. 1321243.6

(51) Int. Cl.
 *B60K 5/12* (2006.01)
 *F16H 57/025* (2012.01)
 *F16F 1/38* (2006.01)

(52) U.S. Cl.
 CPC .......... *B60K 5/1208* (2013.01); *B60K 5/1241* (2013.01); *F16F 1/3849* (2013.01); *F16H 57/025* (2013.01); *B60K 5/1216* (2013.01)

(58) Field of Classification Search
 CPC ..... B60K 17/00; B60K 5/1208; F16H 57/025; F16F 1/38; F16F 15/08; F16F 1/3849
 See application file for complete search history.

(56) References Cited

U.S. PATENT DOCUMENTS

| 4,779,834 A | 10/1988 | Bittner | |
|---|---|---|---|
| 5,460,238 A * | 10/1995 | Burke | B60K 5/1216 180/299 |
| 5,967,251 A * | 10/1999 | Turl | B60K 5/1241 180/297 |
| 7,140,603 B2 * | 11/2006 | Maeno | B60K 5/1208 267/140.13 |
| 2003/0047661 A1 * | 3/2003 | Chenais | F16F 1/3814 248/638 |
| 2011/0005854 A1 | 1/2011 | Fsadni | |

FOREIGN PATENT DOCUMENTS

| DE | 202013102964 U1 | 7/2013 |
|---|---|---|
| KR | 20130065329 A | 6/2013 |

OTHER PUBLICATIONS

Intellectual Property Office, Search Report for the corresponding Great Britain Application No. 1321243.6 mailed Jun. 25, 2014.

\* cited by examiner

*Primary Examiner* — Paul N Dickson
*Assistant Examiner* — Timothy Wilhelm
(74) *Attorney, Agent, or Firm* — Greg Brown; Brooks Kushman, P.C.

(57) ABSTRACT

A roll restrictor for restraining movement of a vehicle powertrain relative to a vehicle sub-frame. The roll restrictor has a bracket for coupling to the sub-frame in the form of a generally U-shaped housing defining a central cavity. A link arm for coupling to the powertrain has a first end positioned within the cavity and extends through an opening in the bracket. A plurality of resilient elements are disposed within the cavity between the housing and the first end of the link arm to resist movement of the first end relative to the bracket.

9 Claims, 3 Drawing Sheets

POWERTRAIN ROLL RESTRICTOR

CROSS-REFERENCE TO RELATED APPLICATIONS

This application claims foreign priority benefits under 35 U.S.C. §119(a)-(d) to GB 1321243.6 filed Dec. 2, 2013, which is hereby incorporated by reference in its entirety

TECHNICAL FIELD

The present disclosure relates to a powertrain roll restrictor for a motor vehicle

BACKGROUND

Automotive powertrains, which generally comprise an engine and transaxle, utilize roll restrictors to prevent unwanted rotation of the engine and transaxle about an axis which, if not coincidental with the engine's crankshaft center axis, is at least parallel thereto. Known automotive powertrain roll restrictors utilize brackets for attaching the restrictor to the transaxle or engine.

In this regard, FIG. 1 shows a roll restrictor system for an automotive powertrain 10 known in the prior art, which was previously disclosed in U.S. Pat. No. 8,215,444B2. The powertrain 10 has an engine 14 and a transaxle 18 with a longitudinal center line A. The powertrain 10 also includes a roll restriction system. The transaxle 18 includes a first mounting pad 22 to which a mounting bracket 26 is attached. A control link 42 connects bracket 26 to a vehicle structural member 46.

A powertrain roll restrictor has many functions. It must simultaneously isolate engine excitation forces at both idle (small force preloads) and wide open throttle (large force preloads), while also controlling powertrain roll during highly transient dynamic events. These conflicting requirements require a part that allows sufficient displacement with a low rate of change of stiffness.

In addition, it is desirable that within the package constraints, a roll restrictor is large enough to allow sufficient rubber volume to meet attribute and durability requirements, while also meeting metal strength and joint capacity criteria. It is also desirable that a roll restrictor allows ease of manufacture by the supplier and ease of assembly within the vehicle assembly plant. Finally, it is desirable that a roll restrictor meets service requirements in terms of replacement time without the need for special tooling or procedures.

SUMMARY

According to a first aspect of the present disclosure there is provided a powertrain roll restrictor comprising a bracket, a link arm and one or more resilient elements between the bracket and an end of the link arm, the end of the link arm being provided within a cavity defined by the bracket, wherein the link arm is configured to be coupled to a powertrain and the bracket is configured to be coupled to a sub-frame of a vehicle and is configured for placement within a pocket of the sub-frame, wherein the powertrain roll restrictor is provided as a single assembly such that the powertrain roll restrictor is insertable into the sub-frame pocket as a one-piece unit.

The powertrain roll restrictor advantageously permits ease of assembly and service whilst also meeting durability and strength requirements.

The bracket may be configured to be placed through an opening of the sub-frame pocket. The powertrain roll restrictor may be configured such that when installed, the link arm may extend though the sub-frame pocket opening.

The link arm may be configured to extend from a powertrain coupling and into the bracket cavity. The link arm may comprise a single piece. The link arm may be coupled to the resilient elements. The resilient elements may be placed in the bracket cavity.

The bracket may comprise a generally U-shaped portion. The bracket may comprise one or more flanges provided at ends of the bracket, e.g. at ends of the U-shaped portion. The flanges may be configured to abut the sub-frame when the powertrain roll restrictor is installed.

The link arm may extend through an opening in the bracket. The bracket may define a shape in a plane. The bracket may have a substantially uniform cross-section. The bracket may comprise a perpendicular projection of the planar shape. The bracket opening may be arranged such that the link arm may extend through the bracket opening in a direction within the plane in which the bracket shape may be defined.

The bracket opening may be between ends of the bracket. Abutment surfaces, e.g. for the resilient elements and/or link arm, may be provided adjacent to the bracket opening. The abutment surfaces may face the bracket cavity. The end of the link arm may be wider than the bracket opening.

The bracket may comprise one or more fastener receiving portions. The fastener receiving portions may be configured for fastening the bracket to the sub-frame. The fastener receiving portions may be configured to receive a bolt, pin or any other fastening means. One or more of the fastener receiving portions may be provided at or towards ends of the bracket. For example, the fastener receiving portions may be provided adjacent to the flanges, such as at an interface between the flanges and the U-shaped portion. One or more of the fastener receiving portions may be provided at or towards a mid-point of the bracket, e.g. at the bottom of the U-shaped portion.

According to a second aspect of the present disclosure there is provided a sub-frame for a vehicle, the sub-frame being configured to receive the above-mentioned powertrain roll restrictor. The sub-frame may comprise an opening into the sub-frame pocket. The sub-frame pocket opening may be configured to receive the bracket upon assembly. The sub-frame may be configured such that the link arm extends though the sub-frame pocket opening when the powertrain roll restrictor is installed.

An assembly may comprise the powertrain roll restrictor and the sub-frame. A vehicle may comprise the above-mentioned powertrain roll restrictor and/or the above-mentioned sub-frame.

For a better understanding of the present disclosure, and to show more clearly how it may be carried into effect, reference will now be made, by way of example, to the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
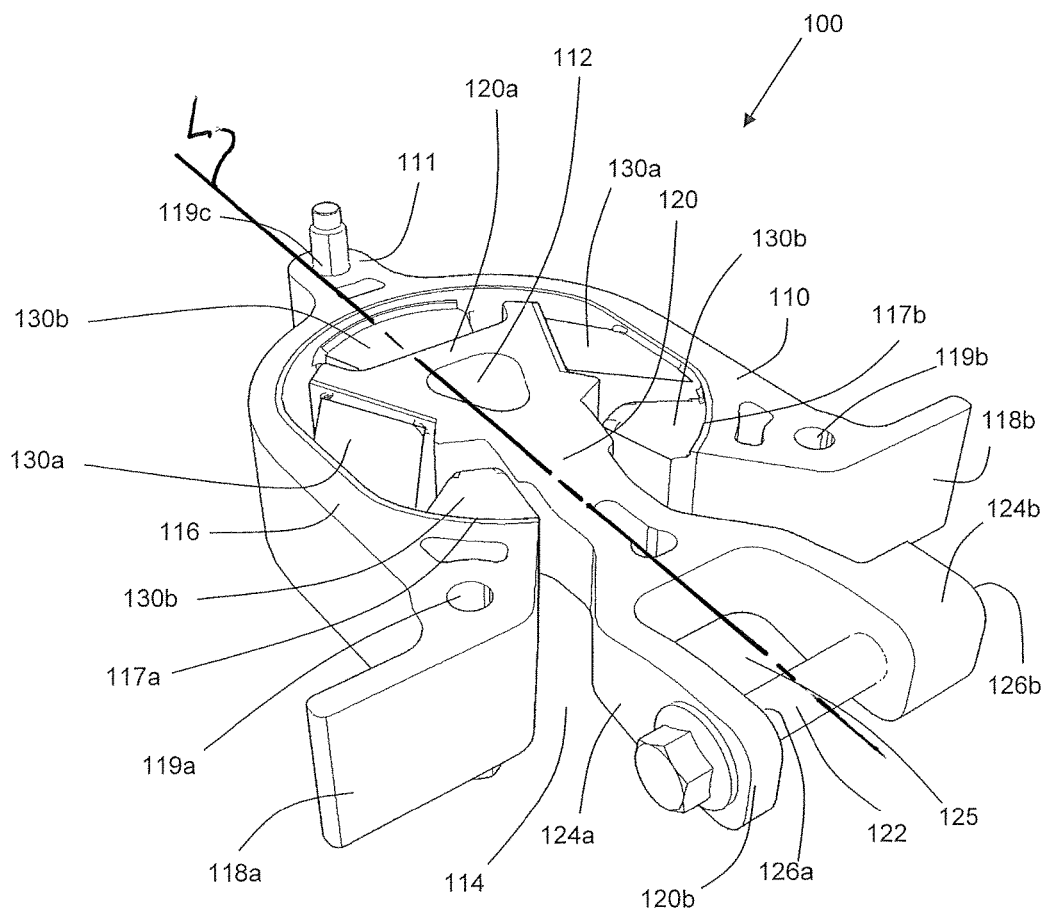
FIG. 2 is a perspective view of a powertrain roll restrictor according to the present disclosure.

With reference to FIG. 2, the present disclosure relates to a powertrain roll restrictor 100, which connects a powertrain (not shown) for a vehicle to a vehicle structure, such as a sub-frame. The powertrain may, as is well known in the art, comprise one or more of an engine, transmission, differential, transaxle or other associated components. The roll restrictor may connect to one or more of these components.

Figure 1:
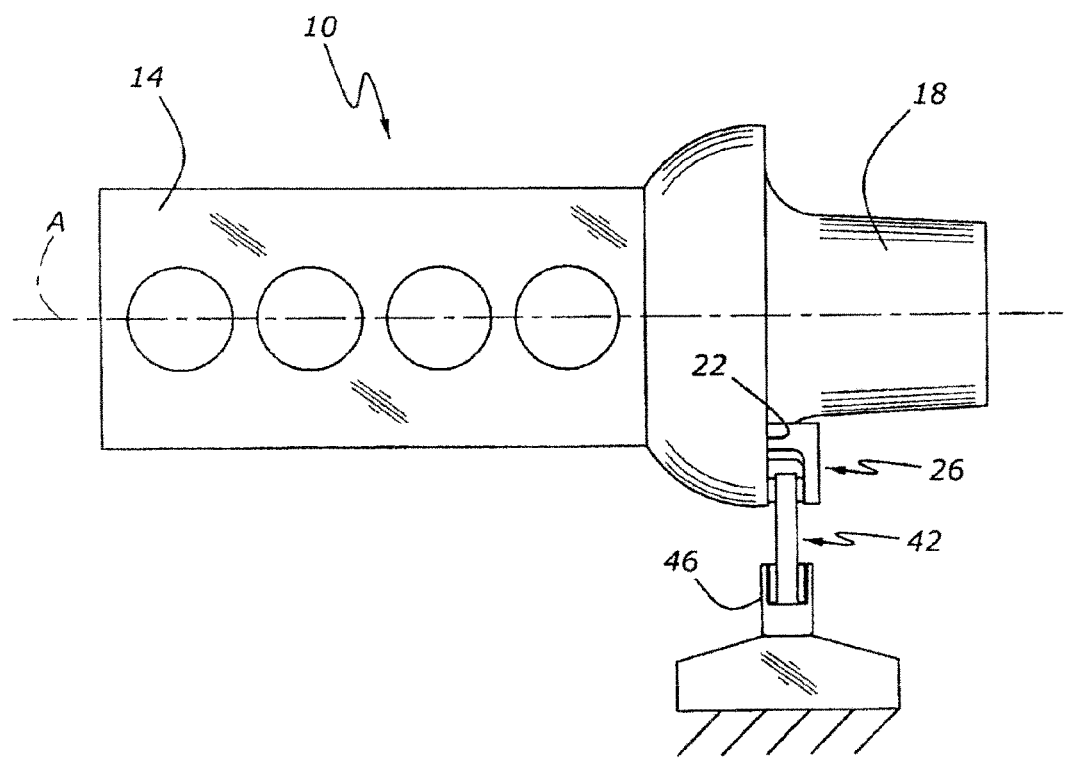
FIG. 1 is a schematic representation of an automotive powertrain having a roll restrictor system according to the prior art as previously disclosed in U.S. Pat. No. 8,215, 444B2.

The roll restrictor 100 comprises a bracket 110, a link arm 120 and one or more resilient elements 130a, 130b. A first end 120a of the link arm 120 is located within a central cavity 112 defined by the bracket 110. An opposite second end 120b of the link arm is configured to be coupled to the powertrain such as that shown in FIG. 1. As will be described in more detail below, the bracket 110 is configured to be coupled to the vehicle structure.

The link arm 120 may be coupled to the powertrain via a connector, such as a bolt 122, extending between a pair of opposing arms 124a, 124b at the second end 120b of the link arm 120. The opposing arms 124a, 124b may extend in a direction substantially parallel to a longitudinal axis L of the link arm 120. The opposing arms 124a, 124b define a space 125, which when installed may accommodate a coupling of the powertrain. The bolt 122 extends across the space 125. The opposing arms 124a, 124b comprise respective openings 126a, 126b, which are aligned to receive the bolt 122. The opposing arm openings 126a, 126b are provided at a distal end of the opposing arms 124a, 124b. One or both of the opposing arm openings 126a, 126b may be threaded for receiving a threaded portion of the bolt 122.

When installed the link arm 120 extends from the powertrain coupling, through an opening 114 in the bracket 110 and into the bracket cavity 112. As depicted, the link arm 120 comprises a single, e.g. unitary, piece that extends from the powertrain coupling into the bracket cavity 112. However, the link arm 120 may alternatively comprise separate components that are joined together.

The resilient elements 130a, 130b are located within the cavity 112 and are positioned between the inner surface of the housing 116 and the first end 120a of the link arm 120. The link arm 120 comprises surfaces for engaging with the resilient elements 130a, 130b. The resilient elements 130a, 130b are bonded to one or both of the bracket 110 and/or the link arm 120.

In the disclosed embodiment, elements 130a are referred to as primary resilient elements and elements 130b are referred to as secondary resilient elements, which may also be referred to as snubbers. The primary resilient elements 130a may be coupled, e.g. bonded, to both the link arm 120 and bracket 110 and as such may resiliently resist movement of the link arm at all times. By contrast, the secondary resilient elements 130b may be coupled to only one of the link arm 120 and bracket 110 and initially may not contact the other of the link arm 120 and bracket 110. As such, the secondary resilient elements 130b resiliently resist movement of the link arm 120 only when the link arm has moved relative to the bracket 110 by an amount sufficient to bring the secondary resilient elements 130b into contact with the other of the link arm 120 and bracket 110. In this way, the resistance to the movement of the link arm 120 can be varied depending on the displacement of the link arm.

The primary resilient elements 130a may be provided at or towards the middle of the bracket cavity 112 and the primary resilient elements 130a may be provided either side of the link arm 120. The secondary resilient elements 130b may be provided at either end of the bracket cavity 112, e.g. closest and furthest from the bracket opening 114, so as to resist the extremes of the link arm 120 movement in either direction.

As the powertrain torque varies, the powertrain may move relative to the rest of the vehicle thereby causing the link arm 120 to move relative to the bracket 110 in the same direction as the link arm's longitudinal axis L. However, the link arm 120 may also move relative to the bracket in other directions, e.g. with the second end 120b moving in a direction perpendicular to the link arm's longitudinal axis L. These movements may be resisted by the resilient elements 130a and/or 130b.

The bracket 110 may define a shape in a plane and the bracket 110 may comprise a perpendicular projection of the planar shape. Accordingly, the bracket 110 may have a substantially uniform cross-section. The bracket opening 114 is arranged such that the link arm 120 extends through the bracket opening in a direction within the plane in which the bracket shape is defined, e.g. the plane containing the uniform cross-section.

The bracket 110 may comprise a housing 116 having a generally U-shaped outer perimeter and flanges 118a, 118b extending from ends of the housing 116 adjacent to the opening 114. The housing 116 and flanges 118a, 118b together define a generally omega-shaped bracket 110.

The bracket opening 114 is provided between ends of the bracket housing, e.g. between the flanges 118a, 118b. The first end 120a of the link arm 120 may be wider than the bracket opening 114. Abutment surfaces 117a, 117b facing the bracket cavity 112 are provided adjacent to and either side of the bracket opening 114 so that the opening 114 is substantially narrower than the central, maximum width portion of the cavity 112. The secondary resilient elements 130b may be coupled, e.g. bonded, to the abutment surfaces 117a, 117b. The link arm 120 may in turn abut the secondary resilient elements 130b coupled to the abutment surfaces 117a, 117b, e.g. when the link arm 120 has been retracted from the bracket 110 (along the axis L) by an amount sufficient to close any gap between the secondary resilient elements 130b and the link arm 120.

The bracket 110 may comprise one or more fastener receiving portions 119. The fastener receiving portions 119 may be configured for fastening the bracket 110 to the vehicle structure, e.g. sub-frame. The fastener receiving portions 119 may be configured to receive a bolt, pin or any other fasteners. For example, the fastener receiving portions 119 may comprise openings, which may be threaded. A pair of the fastener receiving portions 119a, 119b may be provided at or towards ends of the bracket 110. For example, the fastener receiving portions 119a, 119b may be provided adjacent to the flanges 118a, 118b, such as at an interface between the flanges and the housing 116. A fastener receiving portion 119c may be provided at or towards a mid-point of the bracket 110, e.g. on a protrusion 111 at the bottom of the housing 116.

Figure 3:
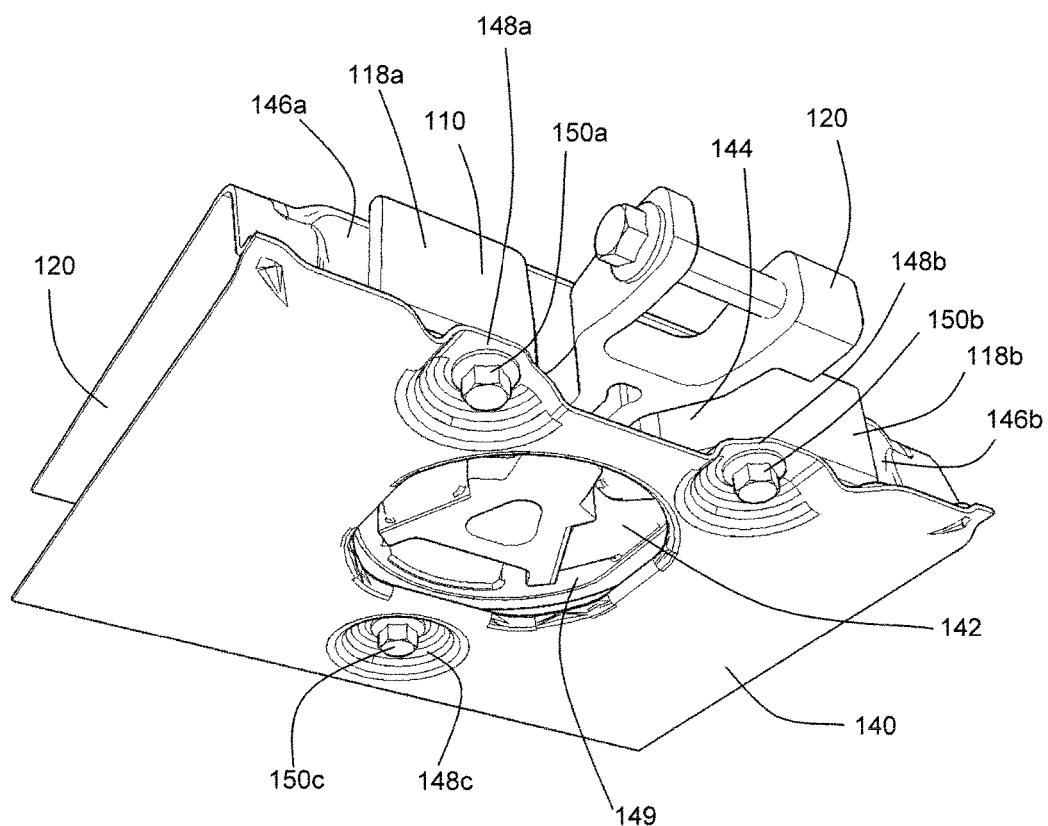
FIG. 3 is a perspective view of the powertrain roll restrictor according to the present disclosure showing the powertrain roll restrictor installed in a sub-frame of a vehicle.

Referring to FIG. 3, the bracket 110 is configured to be coupled to a sub-frame 140 of a vehicle and is configured for placement within a pocket 142 of the sub-frame. The powertrain roll restrictor 100 is provided as a single assembly such that it may be inserted into the sub-frame pocket 142 as a unitary component.

The flanges 118a, 118b are configured to abut surfaces 146a, 146b of the sub-frame 140 when the powertrain roll restrictor 100 is installed. Fasteners 150a, 150b, 150c may pass through openings 148a, 148b, 148c in the sub-frame 140 which align with the fastener receiving portions 119a, 119b, 119c of the bracket 110. As depicted, the fasteners 150 comprise bolts. The openings 148a, 148b, 148c may be provided in recesses formed in the sub-frame, for example so that bolt heads do not protrude beyond the lower (as viewed in FIG. 3) surface of the sub-frame when installed.

The sub-frame 140 is configured to receive the above-mentioned powertrain roll restrictor 100. The sub-frame 140 comprises a pocket opening 144 into the sub-frame pocket 142. The sub-frame pocket opening 144 is configured to receive the bracket 110 upon insertion of the bracket into the sub-frame pocket 142. The sub-frame 140 is configured such that the link arm 120 extends though the sub-frame pocket opening 144 when the powertrain roll restrictor 100 is installed. This arrangement permits ease of assembly and disassembly.

The sub-frame 140 may comprise a window opening 149 in a wall of the sub-frame. The window opening 149 may substantially correspond in size and/or shape to the bracket cavity 112, e.g. to permit visual inspection of the resilient elements 130a, 130b and link arm 120. The window opening 149 may also permit the first end 120a of the link arm 120 to move outside of the space defined by the sub-frame pocket 142, e.g. by virtue of the link arm 120 rotating out of the plane of the bracket.

The sub-frame 140 may be manufactured from metal, such as steel and/or aluminum. However, other materials are also envisaged for the sub-frame, for example composites such as Carbon Fiber Reinforced Plastic or Glass Fiber Reinforced Plastic.

It will be appreciated that the powertrain roll restrictor 100 may be installed by providing the powertrain roll restrictor as a single assembly and inserting the powertrain roll restrictor into the sub-frame pocket as a unitary component. The bracket 110 may then be coupled to the sub-frame, e.g. with the fasteners described above.

The powertrain roll restrictor of the present disclosure advantageously permits ease of assembly and service while also meeting durability and strength requirements. The powertrain roll restrictor also reduces the exposed length of the link arm, which minimizes the gap between the sub-frame and powertrain and helps to satisfy package constraints. The arrangement of the present disclosure also reduces the articulation envelope between the link arm and the sub-frame, which maximizes the clearances and/or allows for additional sub-frame structure.

It will be appreciated by those skilled in the art that although the invention has been described by way of example with reference to one or more examples, it is not limited to the disclosed examples and that alternative examples could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle structure comprising:
   a sub-frame including a pair of opposing sides cooperating to define a pocket;
   a bracket disposed in the pocket and coupled to at least one of the opposing sides, the bracket including a generally U-shaped housing defining a central cavity with an opening narrower than a maximum cavity width;
   a link having a first end wider than the opening, the link extending through the opening in the bracket and through an opening in the pocket to position a second end of the link outside of the bracket and the pocket for coupling to a powertrain;
   a first resilient element disposed between an inner surface of the housing and the first end, and directly connected to each of the inner surface and the first end to continuously resist movement of the first end relative to the bracket; and
   a second resilient element disposed between an inner surface of the housing and the first end, and directly connected to only one of the inner surface and the first end and spaced from the other of the inner surface and the first end to define a gap, the second resilient element arranged to resist movement of the first end relative to the bracket when the link moves a sufficient distance to close the gap.

2. The vehicle structure of claim 1, wherein the bracket comprises one or more fastener receiving portions configured for fastening the bracket to the sub-frame.

3. The vehicle structure of claim 1, wherein the bracket further comprises flanges extending from distal ends of the housing and abutting surfaces of the sub-frame.

4. A vehicle structure comprising:
   a sub-frame defining a pocket;
   a bracket coupled to the sub-frame within the pocket and comprising a generally U-shaped housing defining a central cavity with an opening narrower than a maximum cavity width;
   a link having a first end wider than the opening within the cavity, and the link extending through the opening in the bracket and through an opening in the sub-frame pocket to position a second end of the link outside of the bracket and sub-frame pocket for coupling to a powertrain; and
   a plurality of resilient elements disposed between an inner surface of the housing and the first end of the link to resist movement of the first end relative to the bracket, wherein the sub-frame includes a wall having an opening therein, and the opening is aligned with the bracket cavity to permit visual inspection of the resilient elements and the link.

5. The vehicle structure of claim 4 wherein, the plurality of resilient elements further includes a first set of resilient elements and a second set of resilient elements, the first set of resilient elements being attached to each of the bracket and the link, and the second set of resilient elements being attached to only one of the bracket and the link.

6. The vehicle structure of claim 5, wherein the second set of resilient elements are attached to the bracket.

7. The vehicle structure of claim 4, wherein the plurality of resilient elements further includes a first set of resilient elements and a second set of resilient elements, the first set of resilient elements being disposed between the inner surface of the housing and the first end, and directly connected to each of the inner surface and the first end to continuously resist movement of the first end relative to the bracket, and the second set of resilient elements being disposed between an inner surface of the housing and the first end, and directly connected to only one of the inner surface and the first end and spaced from the other of the inner surface and the first end to define a gap, wherein the second set of resilient elements is arranged to resist movement of the first end relative to the bracket when the link moves a sufficient distance to close the gap.

8. The vehicle structure of claim 4, wherein the second end of the link includes a fastener configured to connect to an engine.

9. A vehicle structure comprising:
   a sub-frame defining a pocket;
   a U-shaped bracket defining a cavity with a mouth and disposed in the pocket with a sidewall of the pocket spanning over the cavity;
   a link extending through the mouth and having an end wider than the mouth; and
   a resilient element disposed between the U-shaped bracket and the end, wherein the sidewall defines an opening aligned with the cavity permitting inspection of the link.

\* \* \* \* \*